United States Patent
Tafoya

[11] 4,057,784
[45] Nov. 8, 1977

[54] BI-DIRECTIONAL SCANNER ASSEMBLY

[75] Inventor: Benny R. Tafoya, Furlong, Pa.

[73] Assignee: Sperry Rand Corporation, New York, N.Y.

[21] Appl. No.: 727,196

[22] Filed: Sept. 27, 1976

[51] Int. Cl.² .............................................. G06K 7/10
[52] U.S. Cl. .............................. 340/146.3 F; 235/467; 250/568; 340/146.3 Z; 350/6
[58] Field of Search .................. 340/146.3 Z, 146.3 F, 340/146.3 S; 235/61.11 E; 178/7.6; 350/6, 7; 250/568

[56] References Cited
U.S. PATENT DOCUMENTS

| | | | |
|---|---|---|---|
| 3,676,645 | 7/1972 | Fickenscher et al. | 340/146.3 F |
| 3,728,677 | 4/1973 | Munson | 340/146.3 F |
| 3,818,444 | 6/1974 | Connell | 340/146.3 F |
| 3,845,466 | 10/1974 | Hong | 340/146.3 S |
| 3,902,048 | 8/1975 | Fleischer et al. | 340/146.3 F |
| 3,916,158 | 10/1975 | Sansone et al. | 340/146.3 F |
| 3,947,816 | 3/1976 | Rabedeau | 340/146.3 F |

Primary Examiner—Leo H. Boudreau
Attorney, Agent, or Firm—Rene A. Kuypers

[57] ABSTRACT

An optical code reader employs a flying spot scanner which traces a plurality of forward scan patterns wherein each is off-set from one another, and a plurality of reverse scans wherein each is off-set from one another and the generation of each forward scan is followed by the generation of a reverse scan. Furthermore, the forward and reverse scans are randomly positioned with respect to one another and other reverse and forward scans.

9 Claims, 3 Drawing Figures

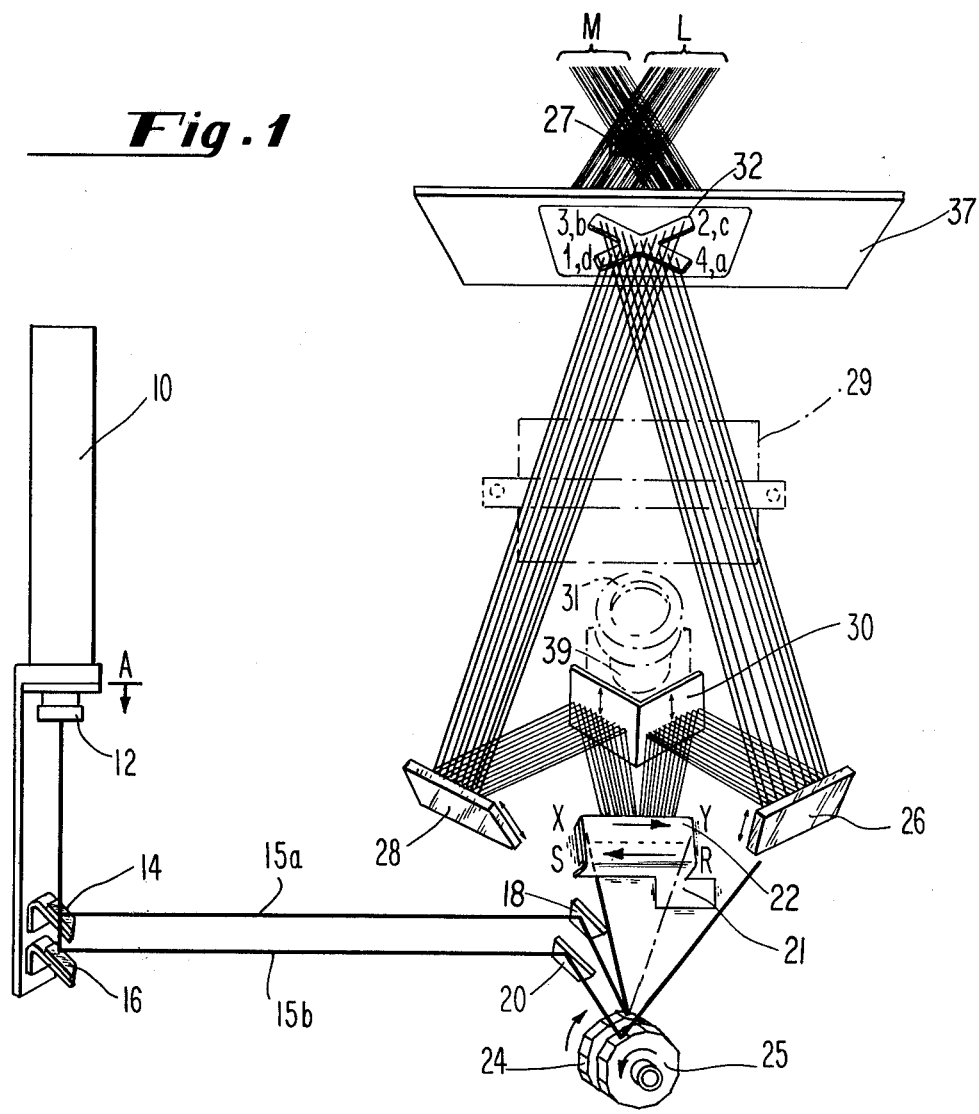
Fig. 1
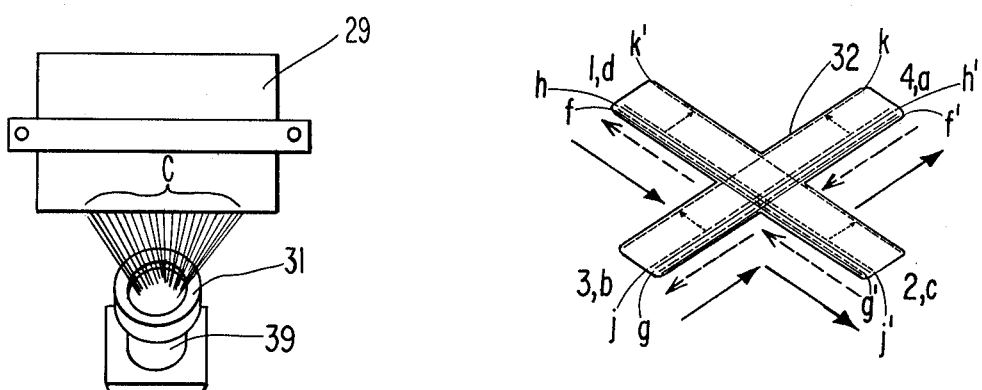
Fig. 1b
Fig. 1a

BI-DIRECTIONAL SCANNER ASSEMBLY

BACKGROUND OF THE INVENTION

1. Field of the Invention

This invention relates in general to the field of optical scanning, and in particular to the field of optical scanning of items carrying an identification code.

2. Description of the Prior Art

In known prior art flying spot X scanning systems shortcomings are encountered in the detection of the code carried by the item being scanned. Particularly, in the scanning of the Universal Product Code (UPC), which is a bar code particularly adapted for the grocery industry, difficulty is encountered in the detection process using X scanners because of the wide variety of contrasts and wide range of scattering co-efficients associated with the different packaging materials used in this business. Some of these packaging materials such as glass, plastic and cellophane wrapped items produce specular reflections which are reflections wherein the angle of incidence equals the angle of reflection. Specular reflections are harmful to the detection process because these reflections tend to saturate the photo-multiplier detector so that a reading cannot be made of the code being scanned. This is a troublesome problem since the clerk in a grocery store must repeat the scanning by re-orienting the item carrying the code and again drawing it across the scanning aperture. Several scans may be necessary before a successful one is obtained. This additional scanning detracts from the desirable features of speed and ease of operation which are desired characteristics of optical scanning.

Another shortcomimg of the known prior art is that it is difficult to raise the emitted laser light source power above a certain level while still complying with federal regulations of the Bureau of Biiological and Radiological Health (BRH). Laser power often must be raised to an excessively high level in order to get an adequate reflection from a low contrast UPC code label. Therefore, if the prior art devices were to raise their laser power source while still complying with the BRH requirements, very sophisticated monitoring devices would have to be incorporated to see how much energy had actually been radiated. Accordingly, if that level of radiation had been radiated. Accordingly, if that level of radiation had been exceeded, the scanning equipment would have to be shut off for a certain amount of time before it could be turned on again. The monitoring equipment which would be required would be an additional piece of equipment that not only adds much additional expense to the scanner device, but in addition complicates its operation.

Another shortcoming of the prior art is that the data or reading rate is too slow. A slow reading rate decreases the performance of the scanner system and prevents it from becoming a viable product in the market place.

Therefore, in the light of the above discussion, the prior art is limited in solving the problems above discussed.

SUMMARY OF THE INVENTION

In accordance with the present invention, a flying spot scanner is utilized to develop a scan in an X shaped slot for use with the UPC bar code which provides increased data rate, bi-directional scanning through the bar coded label, immunity to sources of specular reflections, compliance with BRH regulations at increased power, increased depth of field and apparent depth of field at the scanning aperture. Apparent depth of field may be defined as successfully scanning a UPC label on a skewed surface because sufficient reflective light is sent back to the detection circuitry.

The present invention obtains the above stated synergistic effect by producing two light beams wherein each one is alternately reflected off of the reflective surfaces or facets of one of two counter-rotating polygons. The respective reflections off of the counter-rotating polygons alternately strike a vibrating mirror so that a first optical path is provided which projects one of the two originating light beams out of the X slot and against the bar code. This scan may be characterized as being in the forward direction. After the first X projection is produced a second optical path is provided from the second originating light beam, which projects a beam out of the X slot in the reverse direction from said first mentioned beam projection. However, the two X tracings are not only traced in the forward and reverse direction but furthermore they are off-set from one another.

The invention is further characterized in that the vibrating mirror together with other reflective surfaces causes a plurality of such X tracings to be developed in both the forward and reverse directions so that each forward X projection is alternated with each reverse X tracing.

The result of the above optical scanning system is that the system is immune to specular reflections since a plurality of scans are provided bi-directionally and off-set from one another thereby changing the reflecting angles emitted from the scanned surfaces. Bi-directional scanning as used herein signifies that a scan in one direction is followed by a scan in the same direction but in reverse order from the previous scan. This arrangement allows the detection circuitry to have many opportunities to successfully detect the UPC label because of the probability that one of the scans will produce a diffused (scattered) rather than specular reflection. Also since the beam is off-set on alternate scans the system is able to meet the requirements of the government as set forth by BRH regulations on radiation because the average power levels emitted from the slot are substantially reduced. The reason for this is that the BRH regulations are based on a stationary frame of reference whereas the present invention has a moving frame of reference.

The bi-directional scan of this invention also doubles the data rate because it provides a reverse scan while the prior art forward scan would be recovering before instituting another forward scan.

The scanning system of this invention also provides increased depth of field at the scanning slot which is significant because it enables a successful scan to occur even though the coded grocery item is drawn across the optical scanner by the operator at a distance removed from the X slot located in the counter.

The apparent depth of field has also been substantially increased because more light has been allowed to reach the detection circuitry thereby enabling grocery items to be successfully decoded despite the fact that grocery items are drawn across the X slot at skewed angles.

It is therefore an object of this invention to provide a new and improved optical scanning system for use with coding systems and particularly with the UPC bar code.

BRIEF DESCRIPTION OF THE DRAWINGS

FIG. 1 depicts the bi-directional scanner assembly.

FIG. 1a illustrates the X slot and scan tracings in greater detail.

FIG. 1b shows the detection apparatus in greater detail from that shown in phantom in FIG. 1.

DESCRIPTION OF THE PREFERRED EMBODIMENT

Referring now to FIG. 1, there is shown an arrangement for obtaining a multi bi-directional scan as taught by this invention wherein the light source for the scanning system is a helium-neon laser 10 having a wave length of 6,328 Angstroms. In the preferred embodiment the laser 10, which is made by Metrologic Inc., produces a power output of between 0.8 and 1 milliwatts and a beam diameter of approximately 40 mils. The laser 10 incorporates an adjustable spot focus assembly 12 which includes a positive or converging lens having a focal length of 38 millimeters. Present within the metal casing of the laser 10 but not shown is a negative or diverging lens having a focal length of −4 millimeters which cooperates with the positive lens 12. The combination of the positive and negative lens provides an F number of 136 and reduces the beam diameter from 40 mils to 5 mils. The F number is the ratio between the focal length and the diameter of the lens. The reason for this selection of a relatively high F number will be discussed in a later paragraph.

As the light beam emanates from the laser 10 and the spot focus assembly 12 it strikes the dichroic beam splitter 14. The dichroic beam splitter 14 contains a crystalline structure which causes some of the light from the light source 10 to be deflected at right angles to form a beam 15a, and pass the remainder of the light so that it strikes the 45° mirror 16 to form a second light beam 15b. The beam splitter 14 divides the original beam from the laser assembly 10 into two equal beams so that the split beams 15a and 15b have equal power although it should be understood that the originating light beam may be divided into other ratios for purposes that will be discussed later. Accordingly, after the beams 15a and 15b have been split they respectively travel to the 90 percent (i.e., degree) deflection mirrors 18 and 20. After the two beams 15a and 15b have been respectively reflected off of the 90 percent deflection mirrors 18 and 20 they impinge upon respective counter rotating polygons 24 and 25.

The polygons 24 and 25, which are separated by approximately 2 mils, hve 12 equal sides and each of the 12 equal sides provides another highly reflective surface for the beams 15a and 15b as they are reflected respectively off of the mirrors 18 and 20. The clockwise rotating polygon 24 and the counter clockwise rotating polygon 25 are coupled to a shaft and gearing arrangement (not shown) which in turn is coupled to a synchronous motor (not shown). The motor causes polygons 24, 25 to rotate at an angular velocity of 1800 RPM. The counter rotating polygons 24 and 25 are also phased with respect to one another so that the reflecting surfaces or facets of the polygons are offset from one another on the shaft by 15°. The length of the optical path discussed to this point and beginning from point A next to the laser and optics assembly 10 to the facets of the polygons 24 and 25 is approximately 7½ inches.

In FIG. 1, the light beam 15a is shown being reflected off the surface of the clockwise rotating polygon 24 up to a vibrating mirror assembly 22, whereas the light beam 15b reflected off of the facet of the counterclockwise rotating polygon 25 is shown being reflected out of the range of the vibrating mirror 22. As the polygon 24 continues to rotate it causes the light beam 15a reflected off of mirror 18 to sweep across the vibrating mirror in the direction X to Y. As soon as the optical path of the beam 15a is past Y on the vibrating miror 22 the optical path provided for the beam 15b will impinge upon the vibrating mirror 22 at R and scan to S. Accordingly, when one beam completes a scan across the vibrating mirror assembly 22, immediately thereafter the second beam will initiate a scan across the mirror 22 in a reverse direction. This forward-reverse function of the light beams are provided by the offset, counter-rotating reflective polygons 24, 25.

The mirror assembly 22 is connected via an extension 21 to a crank (not shown) and synchronous motor (not shown). When the motor which rotates at 1,800 RPM is energized the mirror 22 vibrates back and forth harmonically into and out of the plane of the paper within a 4° limit. The mirrors 18, 20 are adjustable so that the light beams 15a, 15b impinge on the mirror 22 at approximately the same location on its face, namely, at the midpoint shown by the dotted line.

The optical paths provided by the beams 15a, b after reflection from the mirrors 18, 20 and a facet of the rotating polygons 24, 25 will now be discussed in some detail. Since the rotating polygons 24, 25 have 12 equal sides each facet comprehends an angle of 30°. In actual practice only about half or approximately 14.7° are utilized in the deflection of the optical path from X to Y on the vibrating mirror assembly 22. The remainder of the 30° is not utilized.

Let us assume the situation for the purposes of explanation and ease of understanding that the vibrating mirror 22 is stationary while the polygon 24 is rotating at its nominal speed of 1,800 RPM in a clockwise direction. Let us further assume that the reflected beam from a facet of polygon 24 begins to sweep across the vibrating mirror 22 from X in the direction of Y although it should be understood tht upon start-up the sweep may start anywhere between X and Y. As the beam 15a sweeps from X and half way across to Y, reflections are produced which are transmitted to the left half of the split mirror assembly 30. Thereafter, the optical path is such that the reflections from the left hand split mirror assembly 30 impinge upon the side mirror assembly 28 and then traces one leg of the X slot 32 by moving the beam from 1 to 2. It should be noted hereat that the legs comprising the X slot 32 are orthogonal to one another. It should also be understood that the X slot 32 shown in FIG. 1 is viewed from the underside of the counter 37. The X slot 32 may be viewed from a top view by referring to FIG. 1a wherein the beam 15a emanating from the left-hand split mirror assembly 30 traverses a direction 1-2 as shown by a solid arrow and a solid line f shown as one leg within the X slot 32.

As the beam 15a proceeds from its midpoint to Y across the vibrating mirror 22 after reflecting off of the facet of polygon 24, reflections are produced which impinge upon the right-hand half of the split mirror 30. The optical path then follows a path similar to that described with respect to the reflections off the left-hand side of the split mirror 30. Thus, the beam 15a is reflected from the right-hand split mirror 30 to the side mirror 26 and thence to the X slot 32. The optical path is such that it completes the formation of an X by following a direction from 3 to 4. This path may be viewed with greater clarity by referring to the solid arrows from 3 to 4 in FIG. 1a and the solid line f shown as one leg within the X pattern. It takes approximately 2.77 milliseconds to complete the formation of one X scan in each direction.

Therefore, from the above description it can be appreciated that an optical tracing is provided in the X slot 32 from the reflection of the beam 15a off of a facet of the polygon 24. It should be noted that the distance followed by the optical path from the facet of the rotating polygon 24 to the vibrating mirror 22 and thence to the split mirrors 30 and the side mirrors 26 up to the X slot 32 is approximately 23.06 inches. Furthermore, the distance from the side mirrors 26, 28 to the X slot 32 is approximately 17.5 inches. It should also be noted that the width of the respective legs of the X slot 32 is 1¼ inches whereas the prior art X slot was only ¼ of an inch. The significance of this feature will be discussed later.

It can be appreciated from the above discussion that a single X scan has been generated in the X slot 32 by means of the optical path that has been produced. This X scan which emanates out of the X slot 32 strikes the UPC code 27 as it is drawn across the slot by the operator in a typical grocery store operation. The beam projection just described, namely, that produced in going from 1-2 appears as one of the projections in the scan grouping L. The remaining projection produced in going from 3-4 is included in the grouping identified as M and is designed to scan the remaining one-half of the UPC label.

The generation of the X scan above described occurred when the clockwise rotating polygon 24 projected a beam across the vibrating mirror from X to Y. As soon as the rotation of the polygon 24 causes the beam 15a to project out of the range of the vibrating mirror 22, the second beam 15b is brought into its range as the polygon 25 continues to rotate in a counter-clockwise direction. In other words, the counter-rotating polygons 24 and 25 are phased so that as soon as the beam 15a completes its forward scan in going from X to Y, the next beam 15b is ready to strike the vibrating mirror 22 to begin another scan cycle which proceeds from R to S.

In discussing the optical path traversed by the beam 15b, it will again be assumed in the discussion following that the vibrating mirror assembly 22 is at the peak of its sinusoidal motion so that its velocity is nearly zero and the polygons 24, 25 are rotating. As the beam 15b is projected from the facet of the rotating polygon 25 onto the vibrating mirror 22 from R to one-half the distance between R and S there is a reflection onto the right hand side of the split mirror 30. From the right side of the split mirror 30, the light beam 15b reflects onto the side mirror 26 and thence from a to b on the X slot 32.

It therefore can be seen that upon completion of the forward scan 1, 2, 3, 4 (FIG. 1 and 1a) a reverse scan is being developed from a to b. This may be viewed more clearly by referring to FIG. 1a where the initial reverse scan direction is depicted by the dotted arrows a, b, and the dotted line g.

As the beam 15b emanating from the reflecting polygon 25 completes its projection from the distance midway between R and S to S, the light beam impinges upon the left hand side of the split mirror assembly 30. The beam then is reflected off of the left hand side of the split mirror 30 to the side mirror 28 and thence to the X slot 32. In particular, the beam traces a path from c to d (see dotted arrows of FIG. 1a and the line g') thereby completing the tracing of an X in the X slot 32 but in the reverse direction from that previously described.

It should also be noted in FIG. 1a that the scan a, b, c, d (in dotted form) in the reverse direction is slightly offset from the scan in the forward direction 1, 2, 3, 4 (in solid form). This results from the fact that after the scan in the forward direction has been completed, there was a slight harmonic or sinusoidal motion of the vibrating mirror 22. This causes the reverse scan to be slightly offset from the previously described forward scan because the activating sinusoidal motion was at the peak where the velocity was nearly zero. In other words, the beam emanating from the mirror 22 has been stepped slightly downwardly on the mirrors 26, 28 and 30 assuming that the mirror 22 is beginning its cycle by moving into the plane of the drawing. This offsetting of the reverse scan with respect to the forward scan can also be visualized by referring to the scan pattern projected against the UPC code 27 in FIG. 1. Thus, the reverse scan from a to b would be in the scan group M and immediately next to and offset from the forward scan generated in going from 3 to 4, and the reverse scan from c to d would be in the scan group L and immediately next to and offset from the previously described forward scan which proceeds from 1 to 2. In effect, one forward X scan is followed immediately by an X scan in the reverse direction and further, the forward X scan is offset from the reverse X scan.

The above described optical paths which have been produced were discussed for ease of understanding with the polygons 24, 25 rotating and with only slight movement of the vibrating mirror 22 after completion of the forward scan. The discussion following will now center upon the fact that the polygons 24, 25 are rotating at 1800 RPM or 30 revolutions per second and the vibrating mirror 22 has been displaced a greater distance into the plane of the drawing because its velocity is beginning to increase due to the extension 21 being activated when the sinusoidal motion is starting on the downslope of the curve. Therefore, the operation will be considered using the above additional factors.

After polygon 25 has rotated sufficiently counter-clockwise so that the beam 15b completes its movement from R to S, the next facet of the clockwise rotating polygon 24 will be in position to allow beam 15a to repeat its scan from X to Y on the vibrating miror 22. In view of the sinusoidal motion of the mirror 22 the reflections onto the split mirror 30 will be moved to a lower position (i.e., a greater distance into the plane of the paper) than during the first discussed scans. Thus, there will be reflections first from the left hand and then the right hand side of the split mirror 30, and thereafter the beam will be projected onto the respective side mirrors 28 and 26. The reflections from the side mirrors 28, 26 produce another X tracing out of the X slot 32 in the forward direction. By referring again to FIG. 1a, the beam reflected off of the side mirror 28 will produce a forward scan from 1 to 2 (i.e., h) whereas the beam reflected off of the side mirror 26 will produce a scan from 3 to 4 (i.e., h'). However, it can further be seen in FIG. 1a that the last discussed scan will be offset a slightly greater distance from the previous reverse scan because of the previously discussed factor of being on the downward slope of the sinusoidal motion of mirror 22. It should also be noted that a reverse scan is positioned between two forward scans. This result is shown within the X slot of FIG. 1a wherein a reverse scan shown in dotted form is positioned between two forward scans shown by solid lines. Also, the scan from 1 to 2 will be projected out of the X slot 32 against the UPC code 27 (see FIG. 1) and positioned within group L in an offsetting manner from the previous scan and the scan from 3 to 4 will be positioned in group M and will be offset from the previous scan.

Again, when the polygon 24 turns so that the reflection of beam 15a does not strike vibrating mirror 22 the next facet of polygon 25 will be in a position to receive the beam 15b so that its reflection will strike the vibrating mirror 22 and traverse a path across its face from R to S. In a manner previously described the beam will be projected firstly off of the right hand and then the left hand split mirror 30. The beam 15b then follows an optical path such that reflections off of the right hand split mirror 30 are reflected off of side mirror 26 up to the X slot 32 so that a beam from a to b (i.e., line j in FIG. 1a) is traced. Reflections off of the left hand split mirror 30 are reflected from side mirror 28 up to the X slot 32 so that a beam from c to d (line j' in FIG. 1a) is traced thereby forming a reverse scan. This scan is also offset from the previous scan because the beam is moved to a lower position on the mirrors 26, 28 and 30 because the mirror 22 is still moving into the plane of the paper. In a manner previously described it can be seen that a forward direction is depicted as solid line and a reverse scan as a dotted line. Again, the scan from a to b is projected against the UPC code 27 such that it is located in group M whereas the scan from c to d is located in group L.

From the above description it also can be readily appreciated that as the polygons 24 and 25 continue to rotate in opposite directions and at high speed the beams 15a and 15b are reflected off of consecutive facets formed thereon. Thus the beam 15a is reflected off of the mirror 18 and onto the facets of the polygon 24 thereby causing the beam to be projected out of the X slot 32 in the forward direction from 1, 2 and thence from 3 to 4 as can be readily seen from FIG. 1a. On the other hand, the beam 15b which is reflected off of the mirror 20 and onto the various facets of the counterclockwise rotating polygon 25 causes a beam to be projected out of the X slot 32 which is in the reverse direction from the forward directed beam having the direction a, b and then c, d. Therefore, for each facet of the respective rotating polygons, one line is generated in each leg of the X slot 32.

As the vibrating mirror 22 continues to vibrate harmonically into the plane of the paper further consecutive forward and reverse scans are generated. By the time that the mirror's 22 motion has moved all the way into the plane of the paper or has sinusoidally moved from peak-to-peak, a total of six forward X scans and six interlaced reverse X scans will have been generated making a total of twelve X scans (see FIG. 1a). Six of the forward X scans are projected off six consecutive facets of polygon 24, whereas six of the reverse X scans are projected off six consecutive facets of polygon 25.

Upon the mirror 22 completing its motion into the plane of the paper, its actuator (not shown) will cause it to harmonically move back out of the paper's plane. The beams 15a and 15b continue to be consecutively projected off consecutive facets of the respective polygons 24, 25 and onto the vibrating mirror 22. Since the mirror 22 is coming out of the paper, the light projection onto the split mirror 30 and the mirrors 26, 28 will be moved progressively upward thereby again altering the optical path up to the X slot 32. The forward and reverse scans again occur consecutively as previously described but are generated from scans k and k' (i. e., the last generated scans when the mirror 22 was moving into the plane of the paper) in the direction of scans f and f'. These scans are not shown in FIG. 1a for the sake of clarity. Therefore, an additional six forward X scans and six reverse X scans are projected up to the X slot 32 upon completion of the mirror's 22 motion out of the place of the paper. Therefore, a total of 24 X scans (i.e., 12 forward and 12 reverse) are generated in the X slot 32 per revolution of the rotating polygons 24, 25 and per cycle of the vibrating mirror 22 (i.e., the forward and backward motion of the mirror 22 into the place of the paper). These 24 X scans are shown impinging upon the UPC label 27 in FIG. 1. The projections in group M and L are such that the a majority of scans in group L project across one-half of the left-hand bars of the UPC bar code 27, whereas a majority of scans in roup M project across one-half of the right hand bars of the code. The electronic decoder (not shown) which decodes the results of the scan is capable of interpreting the UPC label 27 by decoding one-half of the label at a time. However, since this aspect of the system does not form a part of this invention it will not be further discussed.

It should be noted hereat that it takes approximately 33.24 milliseconds (2.77 × 12) to generate 24 X scans in the X slot 32. This time converts to approximately 30 Hertz/second which is the flicker frequency threshold whereby the human eye cannot detect flicker. Accordingly, the 12 X scans shown in FIG. 1 appear as if they are generated at one instant of time, whereas they are generated consecutively.

It should also be recalled that the motors (not shown) in FIG. 1 causing the rotation of the polygons 24, 25 and the vibration of the mirror 22 are synchronous in nature. Accordingly, when the system in FIG. 1 is initially put into operation, the probability is high that the motors will be out of phase with each other. Therefore, the 24 lines that will be produced in each leg of the X slot 32 (FIG. 1, 1a) will have no particular relationship to each other. In other words, there will be a random positioning of a particular line scan with respect to lines which precede it and which follow it. This is significant in avoiding specular reflections.

It is also also notable that the polygons 24, 25 rotate at 1,800 RPM, each generates 360 X scans per second making a total of 720 X scans per second.

The optical projections emitted from the X slot 32 against the UPC code 27 which is normally carried by a grocery item produce reflections through the X slot 32 to the receiving mirror 29 and narrow band filter 31 and thence to the photo-multiplier tube 39. These are shown in dotted form to show their relative position with respect to the scanning assembly. The narrow band filter 31 filters out all light except light having a bandwidth of 6,328A (i.e., the light generated by the laser 10). In actuality, the receiving mirror 29 and the photo-multiplier tube 39 are located at an angle with respect to the counter 37 so that the reflected optical signals do not interfere with the optical projections up to the X slot 32. FIG. 1b illustrates the receiving mirror 29 receiving the reflections from the UPC code 27 after which they enter into the photo-multiplier tube 39. As is understood in the art the signal received by the photo-multiplier tube is converted thereby into an analog signal. This analog signal is converted into a digital signal by an analog to digital converter. The digitized signal is thereafter processed by a UPC logic circuit which is designed to convert digitized signals into a recognized produce identification.

The output of the UPC logic circuitry is directed to a disk type storage device which causes a match-up to be made of the product identification with the disk stored product identification and price so that information related to price and product can be sent to a cash register for visual display. It should be noted, however, that this aspect of the scanning system is not part of the instant invention.

The present invention produces a bi-directional scanning system because an X projection is produced in the forward direction and is immediately followed by an X scan in the reverse direction. In addition, the bi-directional scan produced by this invention provides a plurality of X scans in a forward direction and a plurality of X scans in the reverse direction, wherein each scan in the forward direction is followed and is offset or displaced by an X scan in the reverse direction. This is a significant feature of the invention since glass, plastic and cellophane containers of some grocery items produce specular reflections when they are scanned. Specular reflections are harmful to the scanning process since they tend to saturate the photomultiplier tube 39 so that no intelligent output signal can be produced thereby. However, by using a plurality of reverse scans and a plurality of forward scans which are intermixed with one another the system allows a grocery item that produces specular reflections to be scanned from different directions and angles where the reflections are all different. This arrangement permits the system to produce diffuse (i.e. reflections which scatter the light in all directions to prevent saturations of the photomultiplier) reflections from the package which are generated by the different angles and directions of the scanning beam upon the UPC code. Therefore, the probability of obtaining a scan that can be successfully decoded is extremely high.

Another advantage of the instant invention is the fact that the data rate or the rate at which data can be processed has been doubled since in effect the reverse X scan of this invention is produced during the time when the prior art has finished providing an X scan in the forward direction and was in the quiescent state while the system readied itself to make another scan in the forward direction. It can be appreciated by those skilled in the art that by doubling the data rate the system can produce useful output data twice as fast without changing the electronics, the logic circuitry or by losing power. In other words, the invention has taken advantage of the time that was not utilized (i.e. dark time) in the prior art when no scanning was being accomplished to double the data rate. Were the prior art to double the data rate, it would have been necessary to produce twice as many scans thereby requiring the light beam to go twice as fast. This would have required a re-engineering of the scanning optics. However, if the prior art scan rate were doubled it would have been necessary to also change the logic circuitry including the clock time to allow it to process signals at twice its prior rate. It therefore can be appreciated that the task facing the prior art to accomplish what is being achieved in the instant invention is formidable.

Another beneficial result produced by the instant invention is that the radiation energy level emanating from the X slot has been reduced by nearly a factor of four over the energy levels produced by the known prior art systems which are not operating in the vibrating mode. The performance regulations for laser devices published in the Federal Register, Volume 40, No. 148; Thursday, July 31, 1975 by the Department of Health, Education and Welfare state that the emission from a laser cannot exceed 0.39 millijoules in $10^4$ seconds for a 7 millimeter stationery frame of reference aperture. Since the instant invention produces a moving frame of reference and not a stationary frame of reference, the energy level is reduced by the significant factor of four and less average power comes out of the slot for twice as many scans that are produced. Accordingly, the present invention can significantly raise the power of its laser source without exceeding the above-mentioned government standards. It should be understood that adequate light source power is a necessity in an optical scanning system of the type disclosed in order to detect low contrast UPC labels which are often used by grocery item manufacturers.

The high F number (i. e., 136 ) provided by the lens system of this invention is significant because it provides a great depth of field. As is understood in the art, the greater the F number, the greater the distance that the len's system will focus on objects. In the present invention the 5 mil diameter beam which focuses on the X slot 32 will not increase by more than 1.5 mils at a distance of 5 inches above the slot. Therefore, the depth of field extends approximately 5 inches above the X slot 32. The minimum distance between the bars of the UPC code is 9 mils and accordingly, the scanning system of this invention will be able to decode the item carrying the UPC label successfully even though the operator passes it 5 inches above the X slot 32.

The widening of the X slot 32 to ¼ inches over that utilized by the prior art which was ⅛ of an inch wide also significantly increases the "apparent" depth of field of the scanning system of this invention. This means that the scanning system of this invention is capable of successfully decoding UPC labels that are not only drawn 5 inches above the X slot 32 but are located by the operator in a tipped or skewed position. The depth of field is called "apparent" for the reason that UPC labels can be successfully scanned on these skewed surfaces because sufficient reflected light from the scanning light is allowed to the PMT via the wide X slot 32. In the known art, the slot was not wide enough to receive a signal reflected off of the UPC label in these unusual positions which enabled it to be decoded.

It will be recalled that the beam splitter of this invention provided a 50-50 percentage split of the power initially provided by the laser source 10. It should be readily understood that the power division of the laser light may be varied such as a 70-30 percentage ratio wherein the 70% beam may be utilized to scan low contrast UPC labels, whereas the 30% beam may be used for items which have specular reflections.

I claim:

1. The method of optically scanning a coded symbol comprising the steps of;
   a. generating two beams of light;
   b. causing the different beams to be reflected off respective counter-rotating surfaces;
   c. directing the beam reflected from a clockwise rotating surface to a vibrating reflective surface;
   d. directing said vibrated beam against a V-shaped reflective surface;
   e. directing further the beam reflected from said V-shaped reflective surface to first and second reflective surfaces to trace an X-shaped scan against said coded symbol;

f. directing upon the completion of said X scan the beam reflected from the counter-clockwise rotating surface successively to said vibrating, V-shaped and first and second reflective surfaces to form an X scan that impinges upon said coded symbol which is off-set from and oppositely traced from said first-mentioned X scan.

2. The method in accordance with claim 1 including the steps of;
  a. vibrating said vibrating reflective surface in a forward direction to trace a plurality of X scans in one direction and,
  b. vibrating said vibrating reflective surface in a backward direction to oppositely trace a plurality of X scans, each X scan trace in the one and opposite direction being alternated with each other.

3. The method in accordance with claim 1 wherein the optical path followed by said two beams of light are substantially equal.

4. An apparatus for optically scanning a bar code formed on a label comprising;
  a. means for producing two light beams,
  b. means for directing one said light beam in a first optical path to generate a plurality of first optical X tracings, each said X tracing being displaced from the previous tracing,
  c. means for directing the second light beam in a second optical path to generate a plurality of X tracings reverse to the direction of said first tracings, each said reverse X tracing being parallelly displaced from the previous reverse tracing and, each one of said reverse tracing being generated immediately after each one of said frist mentioned tracing has been generated,
  d. said first and second optical paths being of substantially equal length, whereby said bar code is scanned by beams having the same resolution.

5. The apparatus in accordance with claim 4 wherein said first and reverse tracings project through a shaped slot to impinge upon said bar code.

6. The apparatus in accordance with claim 4 wherein said means for directing said light beams in different optical paths include a single vibrating reflector.

7. The apparatus in accordance with claim 6 wherein said means for directing said light beams further include two counter-rotating polygons having reflective surfaces.

8. The apparatus in accordance with claim 7 wherein said counter-rotating polygons are displaced from each other by 15°.

9. An apparatus for scanning optically a code formed on a label comprising;
  a. means for generating a source of light
  b. means for splitting said light source into two beams of light,
  c. first and second reflective surfaces,
  d. first and second rotating means each having reflective surfaces,
  e. a vibrating reflective surface means,
  f. third and fourth reflective surface means, said third and fourth reflective surface means being formed into an angular V-shaped configuration,
  g. an X-shaped slot,
  h. said respective light beams being reflected off of said first and second reflective surfaces and onto said first and second rotating means and thence to said vibrating reflective surface,
  i. the respective light beams being further consecutively reflected off said third and fourth, and said fourth and third reflective surfaces,
  j. said light beam reflected off said third and fourth reflective surface forming a series of X tracings in said X-shaped slot each of which is displaced from one another,
  k. said other light beam being reflected off said fourth and third reflective surfaces forming a series of X tracings in a reverse direction from said previous X tracings in said slot each of which is displaced from one another,
  l. each reverse tracing being interposed between each two of said first mentioned tracings and
  m. the optical paths followed by said two light beams being substantially equal.

* * * * *